United States Patent
Horiguchi et al.

[11] Patent Number: 5,974,353
[45] Date of Patent: Oct. 26, 1999

[54] APPARATUS AND METHOD FOR DETECTING RUNNING RESISTANCE OF A VEHICLE

[75] Inventors: Masanobu Horiguchi; Hideki Sekiguchi, both of Atsugi, Japan

[73] Assignee: Unisia Jecs Corporation, Kanagawa-ken, Japan

[21] Appl. No.: 09/013,054

[22] Filed: Jan. 26, 1998

[30] Foreign Application Priority Data

Jan. 27, 1997 [JP] Japan ..................................... 9-012412

[51] Int. Cl.$^6$ .................................................. F16H 59/24
[52] U.S. Cl. ................................ 701/51; 701/54; 477/115
[58] Field of Search ................................. 701/1, 54, 58, 701/51, 56, 55; 477/115, 121, 125

[56] References Cited

U.S. PATENT DOCUMENTS

| | | | |
|---|---|---|---|
| 4,841,815 | 6/1989 | Takahashi | 701/57 |
| 5,035,160 | 7/1991 | Morita | 477/154 |
| 5,672,139 | 9/1997 | Horiguchi | 477/120 |

FOREIGN PATENT DOCUMENTS

| | | |
|---|---|---|
| 4-4351 | 1/1992 | Japan . |
| 5-71623 | 3/1993 | Japan . |

*Primary Examiner*—Michael J. Zanelli
*Attorney, Agent, or Firm*—McDermott, Will & Emery

[57] ABSTRACT

A change amount $\Delta TVO$ is computed as a deviation of a new value for the throttle opening representing engine load from a previous value. When the change amount $\Delta TVO$ is greater than or equal to a positive judgment level TH and engine load is changing rapidly in an increasing direction, computation of running resistance using a detected value for the throttle opening is stopped. However, since when the throttle opening is stable or the throttle opening is changing reducingly, a necessary and sufficient computational accuracy can be maintained, computation of the running resistance is not stopped, and control is carried out based on the computational results.

10 Claims, 6 Drawing Sheets

APPARATUS AND METHOD FOR DETECTING RUNNING RESISTANCE OF A VEHICLE

FIELD OF THE INVENTION

The present invention relates to an apparatus and method for detecting the running resistance of a vehicle, and in particular to technology for detecting the running resistance of a vehicle based on engine load.

DESCRIPTION OF THE RELATED ART

Heretofore there is known a speed change control apparatus which determines a speed change step based on the running resistance of a vehicle.

For example with the apparatus disclosed in Japanese Examined Patent Publication No. 4-4351, a construction is disclosed wherein the generated torque of an engine is computed based on the throttle opening and engine rotational speed, and the running resistance of the vehicle is then computed based on the computed torque, vehicle acceleration and vehicle weight. Then by comparing the running resistance with a set value previously set according to speed change steps, a speed change step is determined to obtain a desired acceleration (engine braking) when travelling downhill.

Moreover, with Japanese Unexamined Patent Publication No. 5-71623, there is disclosed a speed change control apparatus which, due to the fact that the computational accuracy for the running resistance (drive power) deteriorates when the engine load changes rapidly, stops the computation of the running resistance at the time of a rapid change in the engine load and consequently stops the change of the speed change characteristics. More specifically, the construction is such that the absolute value of the change amount of the throttle opening is compared with a predetermined value, and then the absolute value of the change amount is greater than or equal to the predetermined value, then for a predetermined time, the computation of the running resistance and the change of the speed change characteristics based on the running resistance are stopped.

With the control disclosed in the abovementioned Japanese Unexamined Patent Publication No. 5-71623, the construction involves comparing the absolute value of the change amount of the throttle opening with the predetermined value. Therefore if the engine load changes rapidly, then irrespective of the change direction of the engine load, the computation for the running resistance is stopped.

However, it has been found experimentally that when the engine load changes reducingly, the drop in computational accuracy of the running resistance is comparatively small compared to when this changes increasingly. With the control disclosed in Japanese Unexamined Patent Publication No. 5-71623, there is the case where the computation of the running resistance is stopped although the necessary and sufficient computational accuracy could have been maintained. As a result, it becomes clear that with the increase in the time where the computation of the running resistance is stopped, there is a problem that response of the speed change control which is based on the computational result for the running resistance, is worsened.

SUMMARY OF THE INVENTION

The present invention takes into consideration the above problems with the object, with a construction wherein running resistance is computed based on engine load, of ensuring that the stopping of the computation of the running resistance is not more than necessary to avoid the output of low accuracy computational results for the running resistance.

To achieve the above object, the apparatus and method for detecting running resistance of a vehicle according to the present invention is constructed such that computation of the running resistance based on the engine load is stopped when there is a rapid change in the engine load and the engine load is changing increasingly.

With such a construction, at the time of a reducing change in the engine load when the computational accuracy is comparatively high, the computation of the running resistance is not stopped, the computation of the running resistance being stopped only at the time of an increasing change in the engine load where a desirable computational accuracy cannot be maintained.

Furthermore, with the present invention, the construction is such that computation of the running resistance at the time of a rapid change in engine load is stopped, however, the rapid change in engine load is judged based on a judgment level which differs depending on the change direction of the engine load.

With such a construction, different judgment levels are set depending on whether the engine load is changing increasingly or changing decreasingly. The judgment level and an actual change in the engine load are then compared to judge if the engine load is changing rapidly. Consequently, even under conditions where the absolute values of the change amount of the engine load are the same, depending on the change direction of the engine load, there is the case where the computation of the running resistance is stopped and where this is not stopped.

The arrangement may be such that the judgment level is set for each change direction of the engine load so that at the time of a reducing change in the engine load this is judged as a rapid change time in the engine load, only when a change more rapid than at the time of an increasing change is generated.

With such a construction, it is easy to judge the time of an increasing change in engine load as a rapid change condition even under conditions where absolute values of the change amount of the engine load are the same, and provided that at the time of a reducing change in engine load a change more rapid than at the time of an increasing change does not occur, then computation of the running resistance is not stopped.

Furthermore, with the present invention, the construction may be such that the engine throttle valve opening is detected as a value corresponding to engine load, and the rapid change in engine load is judged based on a throttle opening change amount per unit time.

With such a construction, the throttle opening change amount per unit time is computed from the detection results of throttle opening for each unit time, and judgment of whether or not there is a rapid change condition in the engine load is made by comparing the opening change amount with a judgment level.

Furthermore, with the present invention, the construction may be such that the engine throttle valve opening is detected as a value corresponding to engine load, and the rapid change in engine load is judged based on the time required for the throttle valve to change by a previously set opening.

With such a construction, when the time required to obtain the said opening change is short, this is judged as a rapid change condition of the engine load, while if the time is long then this is not a rapid change condition of the engine load.

Other objects and aspects of the present invention will become apparent from the following description of embodiments, given in conjunction with the appending drawings.

DESCRIPTION OF THE PREFERRED EMBODIMENTS

As follows is a description of embodiments of the present invention.

Figure 1:
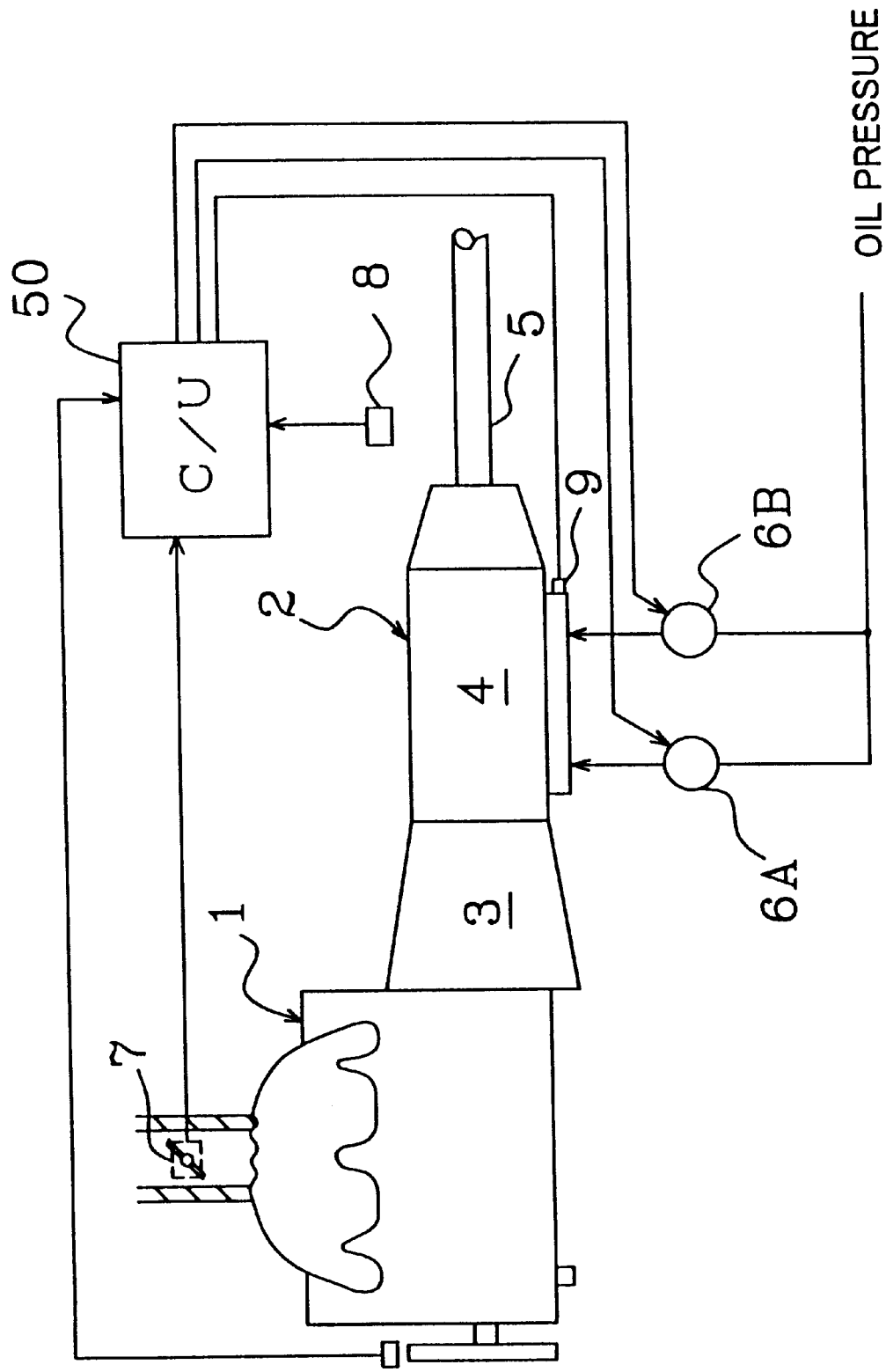
FIG. 1 is a system structural diagram of an automotive internal combustion engine according to an embodiment.

FIG. 1 shows a system configuration of an automotive internal combustion engine according to an embodiment.

In FIG. 1, an engine 1 is connected to an automatic transmission 2 so that the generated torque is transmitted to a vehicle drive wheel (not shown in the figure). The automatic transmission 2 comprises a torque converter 3 into which the generated torque of the engine 1 is input, a multi-step type speed change gear mechanism 4 which takes the output from the torque converter 3 and outputs this after a speed change, and a hydraulic mechanism (not shown in the figure) for driving these.

Solenoid valves 6A, 6B are assembled into the hydraulic mechanism of the speed change gear mechanism 4. By switching open and close combinations of the solenoid valves 6A, 6B, the clamp-release combinations of respective clutches housed in the speed change gear mechanism 4 are changed to thereby effect speed change to a desired speed change step.

ON/OFF control of the plurality of solenoid valves 6A, 6B is carried out based on control signals from a control unit 50 which comprises a CPU, ROM, RAM, A/D converter, input/output interface and so on.

Signals from various sensors are input to the control unit 50.

For the various sensors there is provided, a throttle sensor 7 for generating an output signal corresponding to a throttle opening TVO, and a vehicle speed sensor 8 which detects vehicle speed VSP by detecting a rotational speed of an output shaft 5 of the automatic transmission 2 Since with the present embodiment the throttle opening TVO is made the value corresponding to engine load, then throttle sensor 7 corresponds to the engine load detection device.

Here the control unit 50 computes the vehicle running resistance, and changes the standard speed change characteristics based on the computed result. Changing the standard speed change characteristics, includes alteration of a speed change step which corresponds to the standard speed change characteristics, and selection of the speed change pattern (speed change map) which corresponds to the running resistance.

Figure 2:
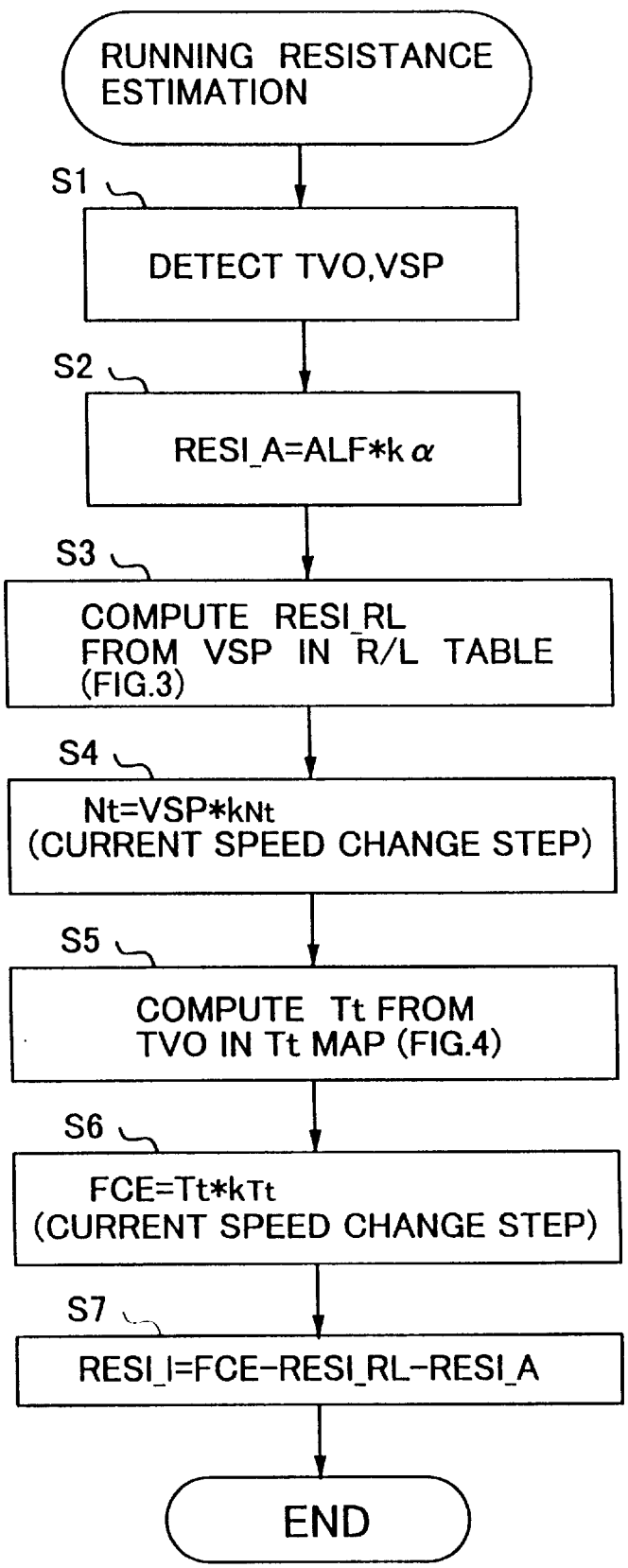
FIG. 2 is a flow chart illustrating aspects of running resistance computations in the embodiment.

The flow chart of FIG. 2 illustrates aspects of running resistance computations carried out by the control unit 50. In step 1 (abbreviated to S1 in the figures, and so on), vehicle speed VSP and throttle opening TVO are read in.

Then in step 2, a current acceleration resistance (RESI-A) is obtained. The current acceleration resistance (RESI-A) can be obtained from the following equation:

$$\text{RESI-A} = \text{ALF} \times k\alpha$$

where: ALF is the current acceleration, and $k\alpha$ is an acceleration resistance computation constant (set according to vehicle weight and the like).

Figure 3:
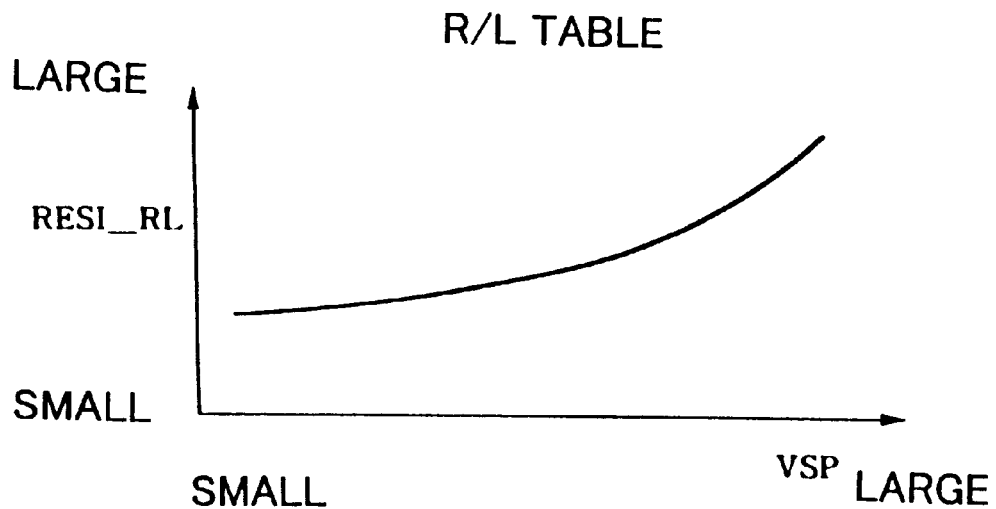
FIG. 3 is a graph showing an air resistance +rolling resistance table of the embodiment.

In step 3, air resistance +rolling resistance RESI-RL corresponding to the current vehicle speed VSP is computed by referring to a table (see FIG. 3) in which air resistance +rolling resistance RESI-RL has been previously stored corresponding to the vehicle speed VSP.

In step 4, a current turbine rotational speed Nt (i.e. torque converter 3 output shaft rotational speed) is obtained. The turbine rotational speed Nt may be obtained from the following equation:

$$Nt = VSP \times kNt(g)$$

where g indicates the current speed change step, and $kNt(g)$ is a constant determined from the current speed change step. The current speed change step may be detected by providing a gear position sensor 9 in the speed change gear mechanism 4, to detect the speed change position. However, this may also be judged from a current speed change indication signal of the control unit 50.

Figure 4:
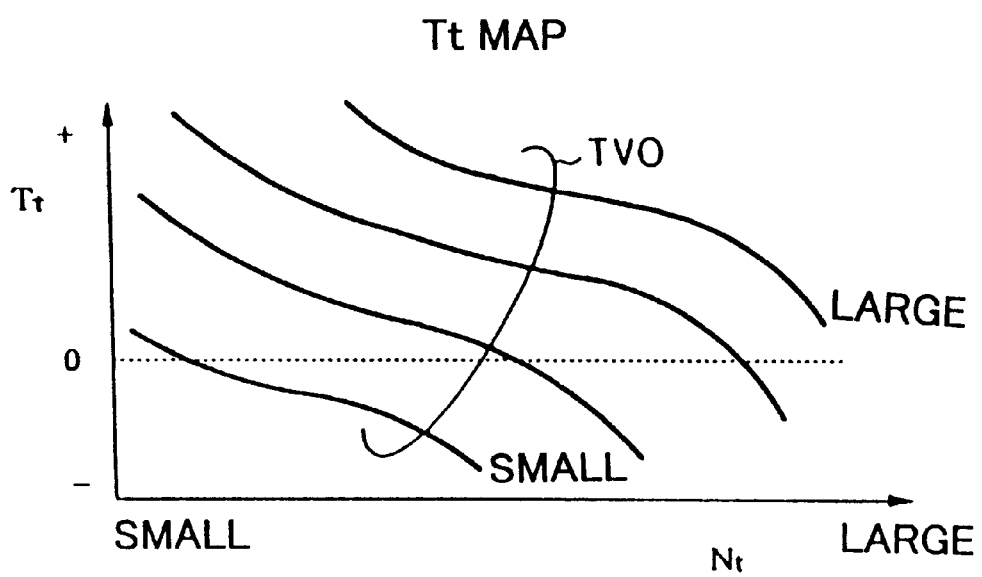
FIG. 4 is a graph showing a turbine torque map of the embodiment.

In step 5, the turbine torque Tt corresponding to the current turbine rotational speed Nt and the throttle opening TVO is computed by referring to a map (see FIG. 4) in which turbine torque Tt corresponding to turbine rotational speed Nt and throttle opening TVO (engine load) has been previously stored.

In step 6, a current drive force (FCE) is obtained from the following equation:

$$FCE = Tt \times kTt(g)$$

where g indicates the current speed change step, and $kTt(g)$ is a constant determined from the current speed change step.

In step 7, a running resistance RESI-I (value corresponding to running resistance) is obtained from the following equation (running resistance computation device):

$$\text{RESI-I} = (FCE) - (\text{RESI-RL}) - (\text{RESI-A})$$

Since the running resistance RESI-I corresponds to incline resistance, then the incline may be obtained as a value corresponding to running resistance. Moreover if the running resistance is computed based on the engine load, then the types of computational methods and running resistance do not pose a limitation. Furthermore, with the configuration of the embodiment, the engine load is represented by the throttle opening, however, a parameter other than throttle opening such as intake air quantity may be used.

As described above, the control unit 50 computes the running resistance RESI-I based on the drive force FCE which is computed based on the throttle opening TVO.

However, at the time of a rapid change in engine load, the error in the drive force FCE increases, so that the computational accuracy for the running resistance RESI-I worsens. Therefore as shown by the flow chart in FIG. 5, the computation of the running resistance is stopped (computation stop device), thereby preventing the speed change characteristics being controlled inappropriately based on erroneous computational results.

Stopping of the computation of the running resistance, as well as involving not carrying out computation processing itself of the running resistance RESI-I, also includes not holding the running resistance computation value at the value immediately prior to stopping, and not using this for speed change control, and not using a computed running resistance for speed change control. Moreover, in the case where a weighted averaging of the computed running resistance is used, then this also includes changing the weighting in the weighted averaging so that for example the degree of influence of the latest computed value is reduced. Furthermore, the control using the running resistance is not limited to speed change control.

Figure 5:
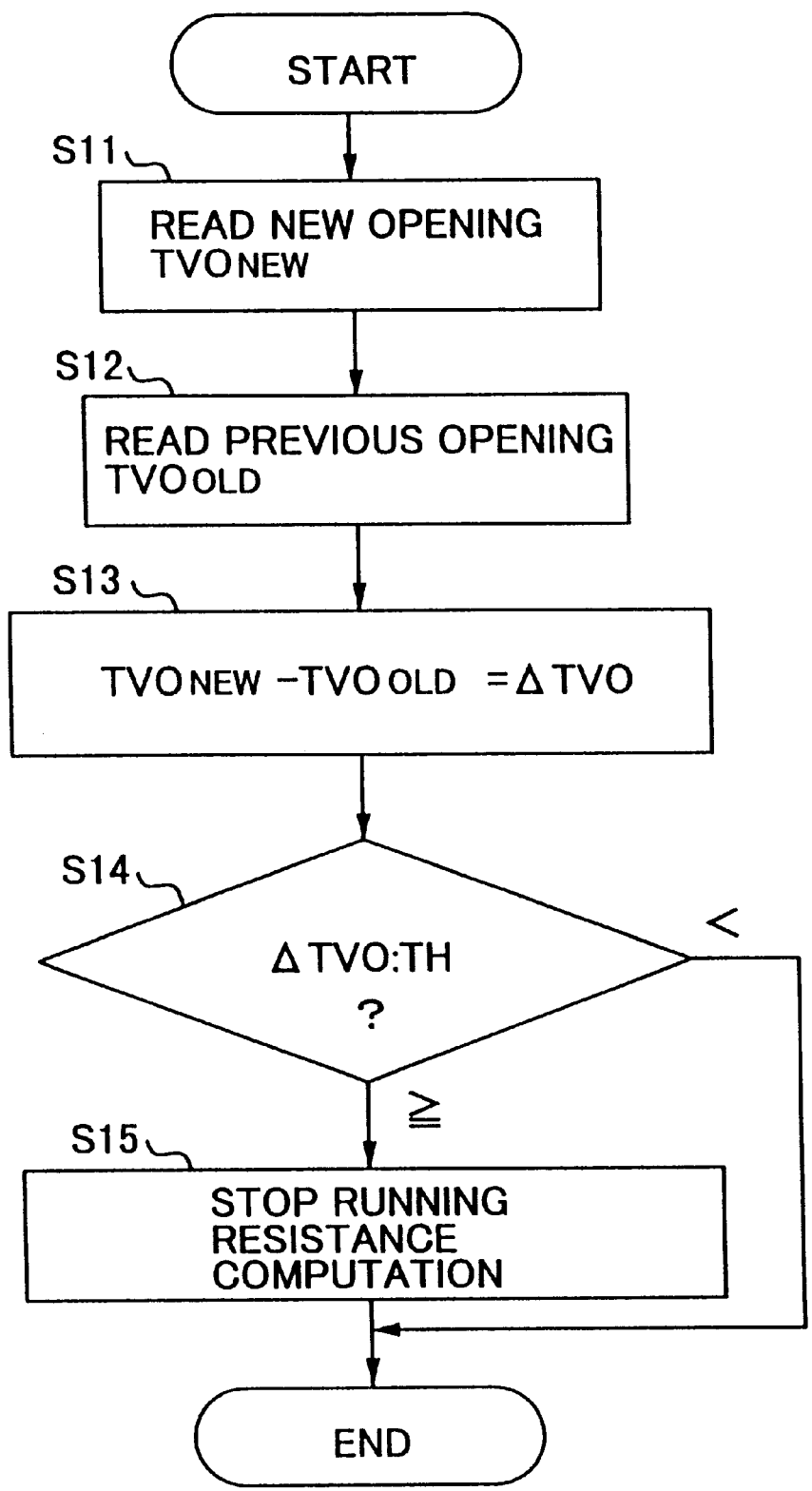
FIG. 5 is a flow chart showing a control routine for stopping running resistance computation according to the embodiment.

The routine illustrated by the flow chart of FIG. 5 is executed for each predetermined time. At first in step 11, a newly detected throttle opening $TVO_{NEW}$ is read.

Then in step 12, a previous value $TVO_{OLD}$, being the throttle opening TVO which was read at the time of the previous execution of the routine, is read.

After this, in step 13, the previous value $TVO_{OLD}$ is subtracted from the new opening $TVO_{NEW}$ to compute a change amount $\Delta TVO$. The change amount $\Delta TVO$ becomes the throttle opening change amount per execution period of the routine (unit time).

Then in step 14, it is judged if the change amount $\Delta TVO$ is greater than or equal to a judgment level TH (>0).

With the change amount $\Delta TVO$, when the throttle opening TVO (engine load) is changing decreasingly, this is computed as a negative value. Therefore when the change amount $\Delta TVO$ is greater than or equal to the positive judgment level TH, the throttle opening TVO is changing increasingly at a speed greater than or equal to a predetermined value, in other words the engine load is increasing rapidly.

When in step 14 the throttle opening TVO is judged to be greater than or equal to the judgment level TH, control proceeds to step 15 to stop computation of the running resistance RESI-1.

On the other hand, if the throttle opening TVO is less than the judgment level TH, that is to say the throttle opening (engine load) is substantially stable, or this is the time of reducing change in the throttle opening (engine load), then step 15 is skipped so as to execute the computation of the running resistance RESI-I and carry out speed change control based on the computational result.

Figure 7:
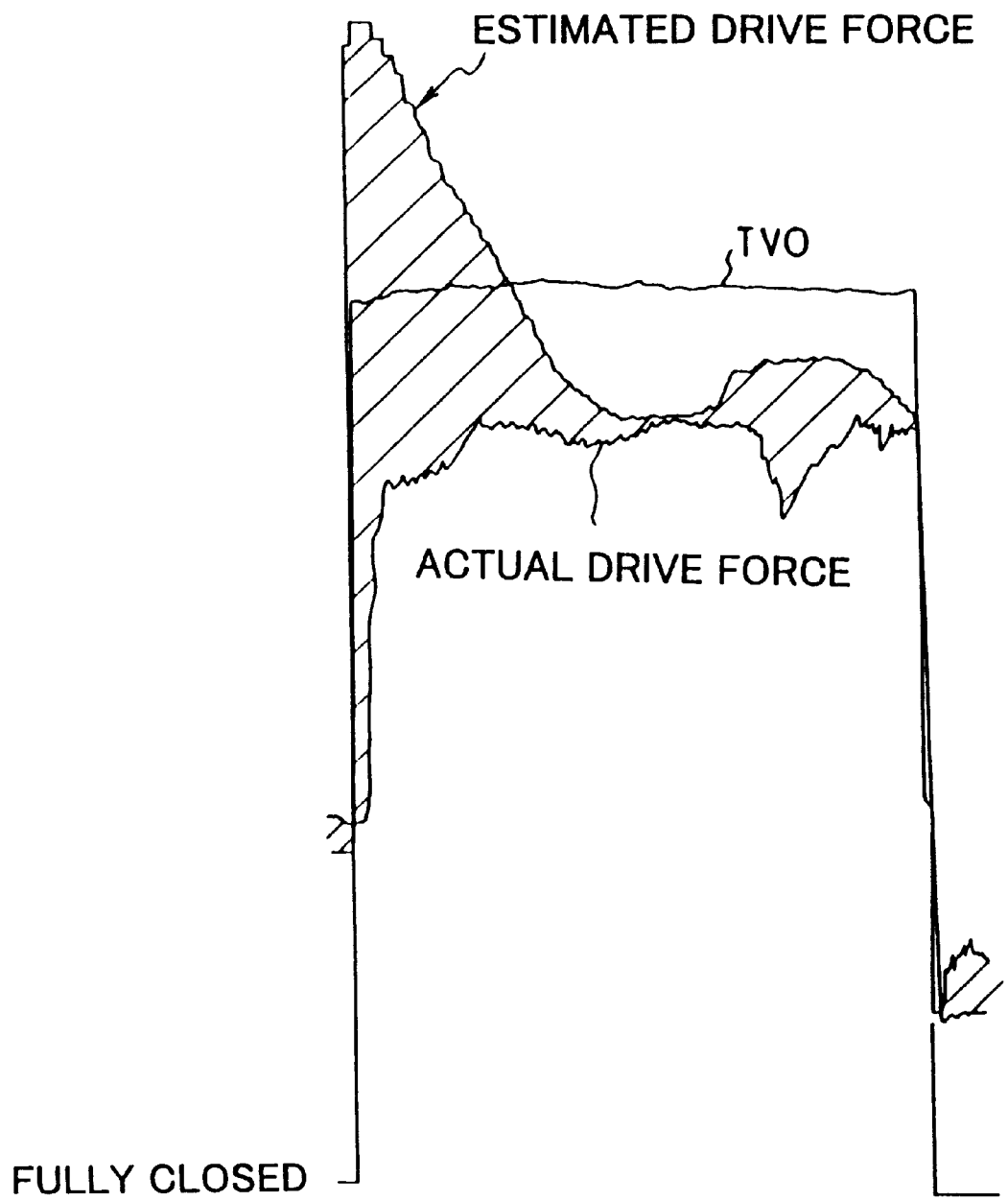
FIG. 7 is a graph showing a correlation between engine load (throttle opening) change and drive force computational error.

At the time of a rapid increase in the throttle opening (engine load), then since as shown in FIG. 7, the computational accuracy of the drive force deteriorates so that computational accuracy of the running resistance is worsened, then as described above, the computation is stopped. However, when the change is in the reducing direction, even though a rapid change with the throttle opening (engine load), a necessary and sufficient computational accuracy can be maintained (refer to FIG. 7). Therefore computation is only stopped at the time of an increasing change. As a result, unnecessary stopping of the computation can be prevented, and hence the time of stopping computation is shortened so that the response of a control using running resistance (speed change control) can be maintained.

Now even if the conditions change from where the change amount $\Delta TVO$ is greater than or equal to the predetermined level TH, to where the change amount $\Delta TVO$ is less than the judgment level TH, the stopping of computation can be continued for a predetermined time.

With the embodiment illustrated by the flow chart of FIG. 5, the construction is such that when the throttle opening (engine load) is changing reducingly, the computation of the running resistance is not stopped. However, while the limits within which the computational accuracy can be maintained are wide compared to at the time of an increasing change, there is the case where if the reducing change is rapid, then the necessary computational accuracy cannot be maintained.

Figure 6:
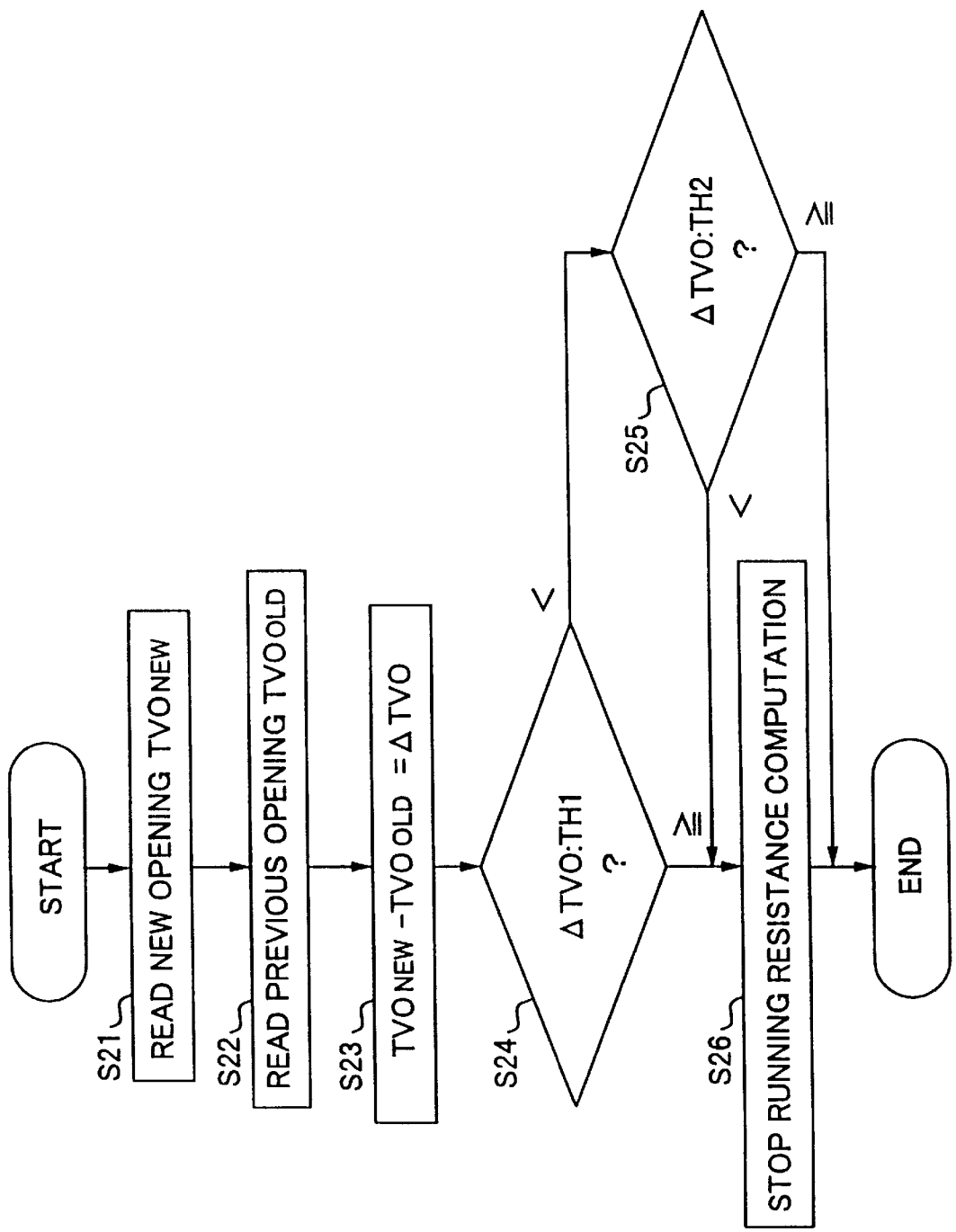
FIG. 6 is a flow chart showing another example of a control routine for stopping running resistance computation according to the embodiment.

Therefore, as shown in FIG. 6, stopping of the computation of the running resistance can be executed.

The routine illustrated by the flow chart of FIG. 6 is executed for each predetermined time. In step 21, 22, 23, as with the previously discussed steps 11, 12, 13, the new throttle opening $TVO_{NEW}$, and the previous value $TVO_{OLD}$ are obtained, and the change amount $\Delta TVO$ computed.

Then in step 24, it is judged if the change amount $\Delta TVO$ obtained by subtracting $TVO_{OLD}$ from $TVO_{NEW}$, is greater than or equal to the positive judgment level TH, to thereby judge if the throttle opening (engine load) is changing increasingly more than a predetermined value. If the change amount $\Delta TVO$ is greater than or equal to the positive judgment level TH1, control proceeds to step 26 to stop computation of the running resistance.

On the other hand, if the throttle opening TVO is less than the positive judgment level TH1, control proceeds to step 25 to judge if the change amount $\Delta TVO$ is less than a negative judgment level TH2, and thereby judge if the throttle opening (engine load) is changing reducingly more than a predetermined value. If the change amount $\Delta TVO$ is less than the negative judgment level TH2, control proceeds to step 26 to stop computation of the running resistance. Moreover, if the change amount $\Delta TVO$ is less than the positive judgment level TH1, but greater than or equal to the negative judgment level TH2, then computation of the running resistance is carried out.

Here the judgment levels TH1, TH2 are set so that $|TH1|>|TH2|$, the absolute value for the change amount $\Delta TVO$ being such as to permit computation up to a larger value at the time of a reducing change. This is because the computational error is smaller at the time of a reducing change in the throttle opening (engine load) compared to at the time of an increasing change. With the construction as described above where the rapid change in the throttle opening (engine load) is judged at respective different judgment levels for the change direction, then occurrence of a computational error which exceeds a permitted level for the respective change directions can be accurately prevented, and computation can be executed to the full.

As described above, it is judged if the engine load is rapidly changing based on the throttle opening change amount $\Delta TVO$ per execution period (unit time) of the routines illustrated by the flow charts of FIG. 5 and FIG. 6. However, it is also possible to measure the time required for the change of a certain opening, and compare the measured time with a standard time serving as a judgment level to thereby judge a rapid change in the engine load. Furthermore in the case where a change amount $\Delta TVO$ within an optional time frame is obtained, and the time frame at the time obtaining the change amount $\Delta TVO$ differs, then the change amount $\Delta TVO$ can be converted to a unit time value and compared with the judgment level.

What is claimed is:

1. An apparatus for detecting running resistance of a vehicle comprising:

engine load detection means for detecting engine load;

running resistance computation means for computing vehicle running resistance based on parameters including at least the engine load detected by said engine load detection means, and outputting a signal for the computed running resistance; and computation stopping means for stopping computation of the running resistance by said running resistance computation means when there is a rapid change in the engine load detected by said engine load detection means, and the engine load is changing increasingly.

2. An apparatus for detecting running resistance of a vehicle comprising:

engine load detection means for detecting engine load;

running resistance computation means for computing vehicle running resistance based on parameters including at least the engine load detected by said engine load detection means, and outputting a signal for the computed running resistance; and computation stopping means which judges if the engine load detected by said engine load detection means is changing rapidly based on a judgment level which differs depending on the change direction of the engine load, and stops computation of the running resistance by said running resistance computation means when there is a rapid change in said engine load.

3. An apparatus for detecting running resistance of a vehicle according to claim 2, wherein said judgement level is set for each change direction of the engine load so that at the time of a reducing change in said engine load this is judged as a rapid change time in the engine load, only when a change more rapid than at the time of an increasing change is generated.

4. An apparatus for detecting running resistance of a vehicle according to claim 2, wherein said engine load detection means detects engine throttle valve opening as a value corresponding to engine load, and said computation stopping means judges said rapid change in engine load based on a throttle opening change amount per unit time.

5. An apparatus for detecting running resistance of a vehicle according to claim 2, wherein said engine load detection means detects engine throttle valve opening as a value corresponding to engine load, and said computation stopping means judges said rapid change in engine load based on the time required for the throttle valve to change by a previously set opening.

6. A method of detecting running resistance of a vehicle including detecting engine load and computing vehicle running resistance based on parameters including at least the detected engine load, and stopping said computation of running resistance when there is a rapid change in said engine load and said engine load is changing increasingly.

7. A method of detecting running resistance of a vehicle including detecting engine load and computing vehicle running resistance based on parameters including at least the detected engine load, and judging if the engine load is changing rapidly based on a judgment level which differs depending on the change direction of the engine load, and stopping said computation of running resistance when there is a rapid change in said engine load.

8. A method of detecting running resistance of a vehicle according to claim 7, wherein said judgment level is set for each change direction of the engine load so that at the time of a reducing change in said engine load this is judged as a rapid change time in the engine load, only when a change more rapid than at the time of an increasing change is generated.

9. A method of detecting running resistance of a vehicle according to claim 7, wherein engine throttle valve opening is detected as a value corresponding to engine load, and said rapid change in engine load is judged based on a throttle opening change amount per unit time.

10. A method of detecting running resistance of a vehicle according to claim 7, wherein engine throttle valve opening is detected as a value corresponding to engine load, and said rapid change in the engine load is judged based on the time required for the throttle valve to change by a previously set opening.

* * * * *